United States Patent [19]

Bresson et al.

[11] 4,211,013
[45] Jul. 8, 1980

[54] GAUGE

[75] Inventors: Clarence R. Bresson; William E. Thornberry, both of Bartlesville, Okla.

[73] Assignee: Phillips Petroleum Company, Bartlesville, Okla.

[21] Appl. No.: 941,696

[22] Filed: Sep. 12, 1978

[51] Int. Cl.² ............................................. G01B 5/00
[52] U.S. Cl. ................................. 33/147 R; 33/147 D
[58] Field of Search ............ 33/147 D, 148 D, 147 R, 33/147 E, DIG. 13, 147 K, 147 J; 73/855

[56] References Cited

U.S. PATENT DOCUMENTS

| 2,177,605 | 10/1939 | Whittemore | 33/147 D |
| 2,376,038 | 5/1945 | Dawson | 33/147 D |
| 2,392,899 | 1/1946 | Banner | 33/147 D |
| 2,524,256 | 10/1950 | Greany | 33/147 R |
| 2,849,797 | 9/1958 | Etchell | 33/147 K |
| 3,376,649 | 4/1968 | Finley | 33/147 K |
| 3,726,018 | 4/1973 | Brenneisen | 33/147 J |

FOREIGN PATENT DOCUMENTS 44393  5/1961  Poland ................................. 33/147 D Primary Examiner—Harry N. Haroian

[57] ABSTRACT

A gauge suitable for use with specimens of various lengths provides very accurate measurement of small changes in the length of a given specimen.

9 Claims, 3 Drawing Figures

GAUGE

BACKGROUND OF THE INVENTION

This invention relates to an apparatus for measurement of changes in the length of a specimen.

A wide variety of gauges for measuring the changes in the length of a specimen are known in the prior art. These gauges include, for example, vernier calipers and micrometer calipers. A particular gauge which may be used to measure small changes in the length of a specimen was described in U.S. Pat. No. 2,177,605. With that apparatus, very accurate measurement was possible. However, that apparatus was limited to measuring the change in the length of specimens having a very narrow range of lengths and thus it is of relatively limited use.

It is an object of this invention to provide a gauge with the capability of being used to obtain a very accurate measurement of small changes in the length of a specimen and which is suitable for use with specimens having a variety of lengths.

STATEMENT OF THE INVENTION

According to the invention, a gauge comprises a first probe; a micrometer mounted on a first base in a fixed position with respect to the first probe, the micrometer having a plunger with a first end; a second probe adjustably mounted on a second base, the second base being movable with respect to the first end of the plunger of the micrometer so that the micrometer will accurately measure very small changes in the distance between the two probes and the gauge can be used to test samples having widely differing lengths.

The instrument of the present invention has great versatility, and changes in length of a given sample can be measured with a precision of 0.0001 inch. The instrument is adjustable, having a capability of measuring changes in length of samples which differ greatly in their initial lengths.

Such an instrument can be advantageously used for any application which requires very accurate measurement of small changes in length. An example of one such application is the measurement of the coefficient of expansion of rubberized asphalt membranes such as those used in the roofing market, for example.

DETAILED DESCRIPTION OF THE INVENTION

Figure 1:
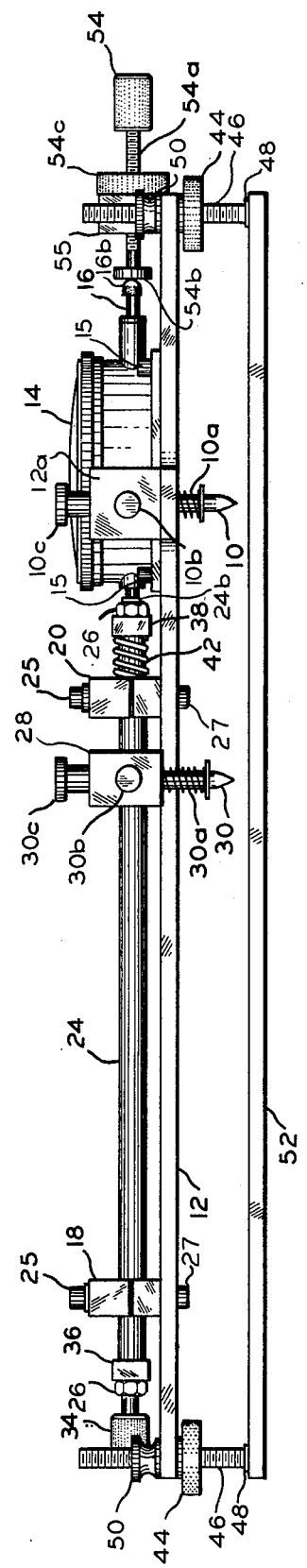
FIG. 1 is a side elevation of an embodiment of the gauge.
Figure 2:
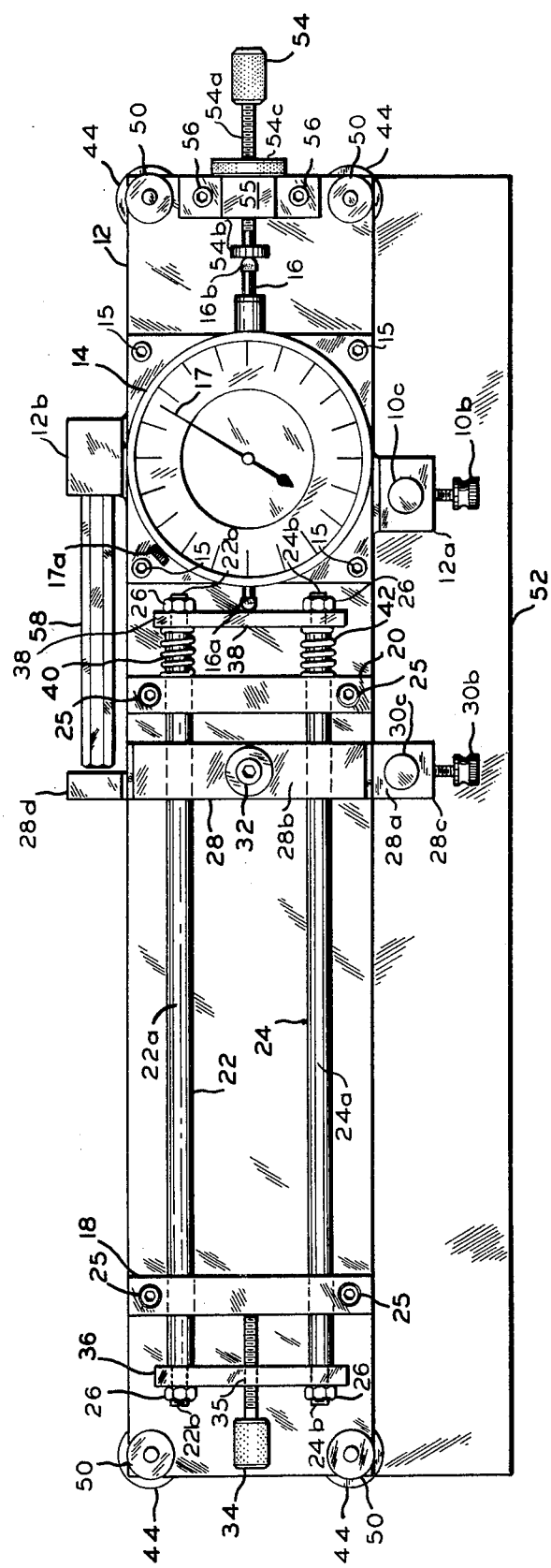
FIG. 2 is a plan view of the embodiment shown in FIG. 1.
Figure 3:
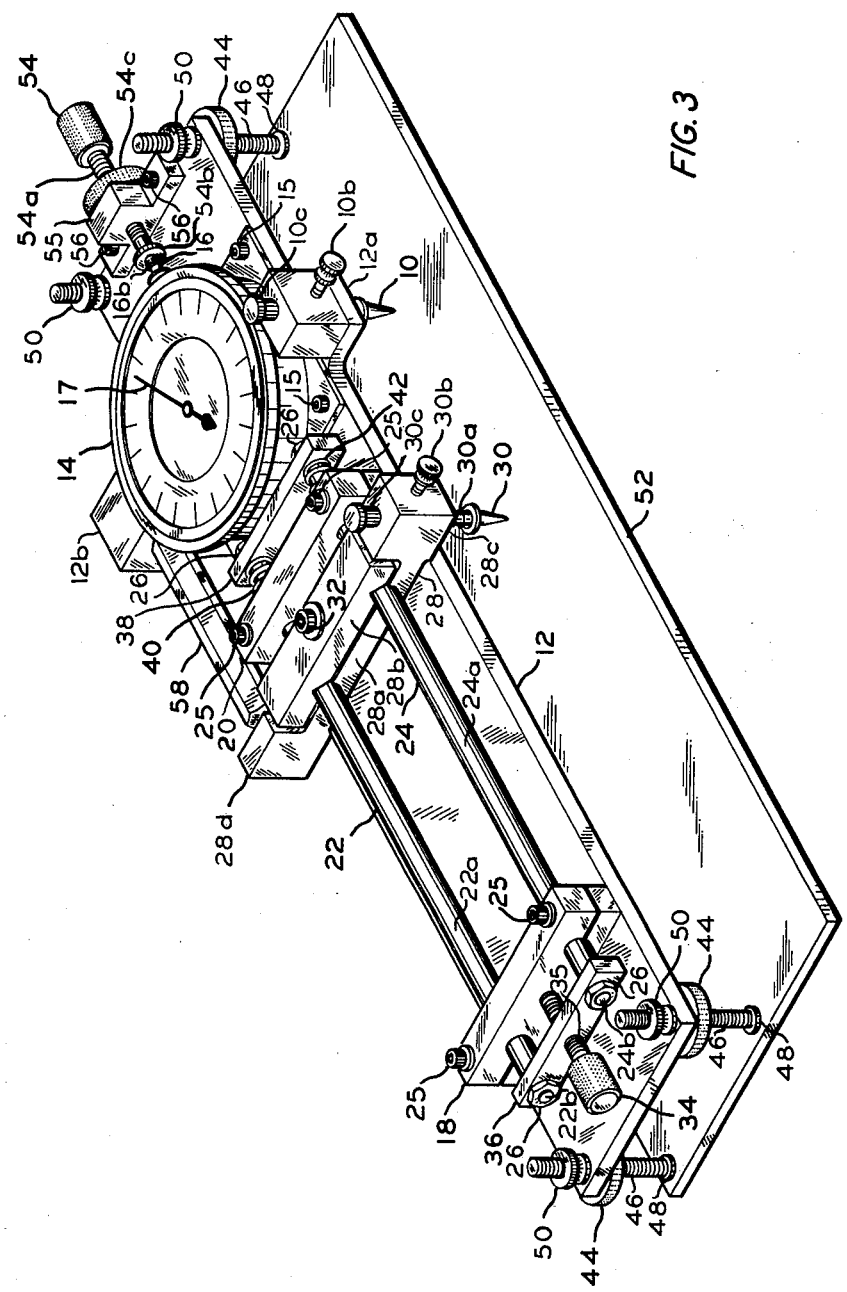
FIG. 3 is a perspective view of the embodiment of the gauge shown in FIGS. 1 and 2.

Referring to FIGS. 1, 2, and 3 of the drawing, wherein any given item will be numbered the same in all three figures, a probe 10 (not shown in FIG. 2), which is spring-loaded with spring 10a, is mounted on a base 12 in a fixed position with respect to dial micrometer 14, which also is mounted in a fixed position on base 12 by mounting screws 15. Dial micrometer 14 has a plunger 16, having a first end 16a and a second end 16b. Dial micrometer 14 also has a pointer 17 and a dial clamp 17a (for zeroing).

Located in fixed positions on base 12 are supports 18 and 20, each of which has two adjustable cylindrical orifices therein (shown clearly in FIGS. 2 and 3 of the drawing), through which the cylindrical portions 22a and 24a of the cylindrical rods 22 and 24, respectively, are passed. Supports 18 and 20 are fixed on base 12 by means of screws 27. Screws 25 are used to adjust the adjustable cylindrical orifices in supports 18 and 20. Rods 22 and 24 also have two threaded portions 22b and 24b, respectively, positioned at each end of each rod. End plates 36 and 38, each having two orifices with a diameter slightly larger than the diameter of threaded portions 22b and 24b of rods 22 and 24, are positioned at end of rods 22 and 24 and secured thereto with nuts 26. At one end of rods 22 and 24 an adjusting screw 34 passes through end plate 36 via a threaded orifice 35 therein and butts up against support 18. A spring 40 is positioned on rod 22 between end plate 38 and support 20, and spring 42 is likewise positioned on rod 24 between end plate 38 and support 20. Rods 22 and 24 provide an adjustable support for adjustable member 28 which supports a second probe 30 at one end. Probe 30 is spring mounted with spring 30a. Adjustable member 28 comprises a first member 28a and a second member 28b which mate together to form two orifices through which rods 22 and 24 are passed. Screw 32 passes through second member 28b of adjustable member 28 and screws into first member 28a of adjustable member 28; and by loosening screw 32, one can reposition adjustable member 28 along the length of rods 22 and 24 between supports 18 and 20.

A screw jack 44 having a threaded member 46 and a base 48 is located at each corner of base 12, the four bases 48 being mounted in fixed positions on base 52. By adjusting screw jacks 44, one adjusts the distance between base 52 and base 12. A locking nut 50 mounted on each threaded member 46 can be positioned against and base 12, and one can thereby lock base 12 into place.

At one end of the apparatus screw 54 with externally threaded member 54a, flat member 54b, and locking nut 54c is supported by support 55, which itself is mounted in a fixed position on base 12 by means of two screws 56. Support 55 has an internally threaded member (not shown) into which externally threaded member 54a of screw 54 can be snugly fitted. Flat member 54b of screw 54 butts up against second end 16b of plunger 16. Locking nut 54c can be positioned against support 55 to lock the position of screw 54.

Probe 10 is mounted in a fixed horizontal position on a segment 12a of base 12, which segment extends beyond the usual boundary of base 12. Knob 10c forms the upper extremity of spring loaded probe 10. Screw 10b is positioned so that its adjustment will permit probe 10 to be locked into a fixed vertical position. Likewise, probe 30 is mounted in a fixed position on an extending extremity 28c of adjustable member 28; and knob 30c and screw 30b perform the same respective functions on probe 30 as knob 10c and screw 10b perform on probe 10, described above.

Between an extending extremity 28d of adjustable member 28 and an extending extremity 12b of base 12, bar 58 is positioned. Within extremity 12b of base 12 there is a threaded female connection (not shown) for receiving a threaded end of bar 58 and thus securing bar 58 to extremity 12b as shown in FIG. 3.

In the operation of the apparatus of the invention a sample (not shown) is placed in the space between base 52 and base 12. Two small holes are placed in the specimen to be measured, the distance between the holes being chosen as desired. Probe 10 is placed over one of these small holes; and the horizontal position of probe 30 is adjusted by turning adjusting screw 34 clockwise which causes end plate 36 to move away from support 18, placing springs 40 and 42 into a state of compression. Conversely, turning adjusting screw 34 counterclockwise causes end plate 36 to move toward support 18 and decompresses the springs. Thus turning screw 34 in the proper direction moves adjustable member 28 which in turn moves probe 30 to the desired position so that probe 30 fits over other the small hole in the specimen. Next, screws 10b and 30b are loosened, and each of the spring-loaded probes 10 and 30 is placed by means of knobs 10c and 30c into a separate small hole; and screws 10b and 30b are tightened if desired, although the main function of screws 10b and 30b are to lock probes 10 and 30 respectively in the raised position for easier sample handling. Then, screw 54 is adjusted so that it contacts the end 16b of the plunger 16 of dial micrometer 14; and screw 54 is further adjusted in the same direction until the end 16a of plunger 16 just contacts end plate 38. This point of initial contact gives an initial reading on dial micrometer 14. Dial clamp 17a can be loosened and the face of dial micrometer 14 can be rotated to give a reading of zero, if desired. The specimen is then removed and is heated (or cooled) on a plate (not shown) having a relatively large mass and being made, for example, of steel. After the desired amount of heating or cooling, the sample is then placed on the gauge as before. The probes are reinserted again aligned with the holes in the specimen by using adjusting screw 34 to adjust probe 30. The probes are then inserted into the holes of the specimen and a second reading on the dial micrometer 14 is taken. The difference between the first reading and the second reading is the change in length of that part of the specimen located between the two small holes. When a dial micrometer having a precision of 0.0001 inch is used in the above-described apparatus, small changes in length of a specimen can be measured to within 0.0001 inch. An example of a suitable dial micrometer for use in the inventive gauge is a Starrett dial micrometer with a 0.400 inch range and a precision of 0.0001 inch.

In accordance with the invention the distance between probe 10 and probe 30 is continuously variable, so that specimens of widely varying sizes can be tested with the apparatus. Many variations of the above description are possible; and instruments employing reasonable variations will be within the scope of the invention. For example, instead of using cylindrical rods 22 and 24, one can use any of a variety of forms, for example, just one cylindrical rod where adjustable member 28 rests against base 12 to prevent rotation. Or alternatively, more than two parallel cylindrical rods can be used.

Another alternative is to use (instead of cylindrical rods 22 and 24), rods having cross sections which are shapes other than circles, for example ellipses, squares, or rectangles. Then, the orifices within supports 18 and 20 would be required to be correspondingly shaped to permit movement of the rods through the orifices.

Another variation of the above-described apparatus which would also be within the scope of the invention is to move probe 30 by some means other than by use of adjusting screw 34 which (as described above) contacts adjustable support 18, thereby moving end plate 38 when the forward motion of screw 34 is stopped by adjustable support 18. For example, a cam-operated eccentric surface could alternatively be used. Any such means is suitable for use in the invention.

Bar 58 (shown in FIG. 2, with one end screwed into extremity 12b of base 12 and with the other end contacting extremity 28d of adjustable member 28) may (if desired) or may not (if desired) be used in the apparatus of the invention. However, the use of bar 58 is preferred when one is measuring many specimens which are the same length and a comparison in the differences of the samples is desired. The use of bar 58 is preferred since it provides a reference length and makes it easier to set up the apparatus for each sample. Further, bar 58 prevents one from inadvertently pushing end plate 38 too far against end 16a of plunger 16 (and therefore it prevents damage to dial micrometer 14). Bar 58 can be of any suitable length for performing these functions.

Cylindrical rods 22 and 24 can be of any desired length so long as they are greater than the distance between adjustable supports 18, 20, the amount by which the cylindrical rods 22, 24 are greater being a projection allowance on each end of each rod for movement of the rods.

Although base 52 and screw jacks 44 (with bases 48, threaded members 46, and locking nuts 50) are preferred so as to provide a gauge which is free-standing, these parts are by no means essential to the invention.

Springs 40 and 42 should be chosen such that their length in absence of compressive force is greater than or equal to the spacing between adjustable support 20 and end plate 38 when end plate 38 is in its position of maximum displacement from support 20; and springs 40 and 42 should be chosen such that the combined restoring force of the springs is sufficient to maintain the end of screw 34 against support 18. Although coil springs are shown in the drawing, any other suitable type of spring can (if desired) be substituted for the coil springs provided that the substituted springs accomplish the functions of the coil springs (described above).

The material used to produce the parts of the gauge can be any material suitable for performing the functions described above. For example, steel, brass, aluminum or magnesium can be used.

When the instrument is to be used to measure a sample such as an asphalt specimen for example, each of the two small holes (described above) which are placed in the specimen can be fitted with a metal fitting having a depression into which a probe (10 or 30) can be placed. Upon heating of the specimen, little distortion of the holes will then take place.

This invention has been described in detail for purposes of illustration, but it is not to be construed as limited thereby. Rather, it is intended to cover reasonable changes and modifications which would be apparent to one with ordinary skill in the art.

I claim:
1. A gauge comprising:
 (a) a micrometer having a plunger which has a first end, said micrometer being mounted in a fixed position on a first base;
 (b) a first probe mounted in a fixed position with respect to said micrometer;
 (c) a second probe adjustably mounted on a second base, said second base being movable with respect to said micrometer and with respect to said first probe and said second base being slidably mounted to a supporting means which is attached to said first base, said second base having a first end and a second end, wherein the first end of the plunger of said micrometer can be positioned against said first end of said second base so that a change in the position of said second probe is measured by said micrometer;

wherein said second base comprises at least two parallel rods, wherein said first end of said second base comprises a first end plate to which one end of each of said rods is fastened, wherein said second end of said second base comprises a second end plate to which the other end of each of said rods is fastened, and wherein said supporting means attached to said first base comprises a first rigid support and a second rigid support, said two rigid supports being spaced apart a distance less than the length of said rods, said first rigid support being positioned near said first plate and said second rigid support being positioned near said second plate, and each of said two rigid supports containing orifices through which each rod is passed, each of said orifices having a diameter approximately equal to the diameter of the rods.

2. An apparatus according to claim 1 wherein said parallel rods are movable with respect to said micrometer by means of an adjusting screw which passes through a threaded orifice in said second end plate, said adjusting screw being rotated until it just contacts said second rigid support, after which initial contact further rotation in the same direction of said adjusting screw causes said parallel rods and said second probe attached thereto to be drawn away from said micrometer.

3. An apparatus according to claim 2 including springs equal in number to the number of rods comprising said second base, said springs being positioned between said first end plate and said first rigid support.

4. An apparatus according to claim 3 wherein said springs are coil springs with one spring concentrically positioned on each rod.

5. An apparatus according to claim 4 wherein the number of said parallel rods is two.

6. An apparatus according to claim 5 wherein said first base is adjustably mounted on at least one support which is fixed to a third base, said third base being spaced apart from said first base at a distance such that specimens can be inserted between said first base and said third base.

7. An apparatus according to claim 6 wherein said first base is adjustably mounted on said third base by means of jack screws.

8. An apparatus according to claim 7 wherein said micrometer is a dial micrometer and wherein the plunger of said micrometer has a second end which can be placed in contact with a second adjusting screw so that a movement of said second adjusting screw results in a corresponding movement of said plunger of said micrometer.

9. An apparatus according to claim 8 wherein said first probe and said second probe are each spring loaded and are each adjustable vertically with respect to said first base.

* * * * *